(12) United States Patent
Wang et al.

(10) Patent No.: US 10,584,968 B2
(45) Date of Patent: Mar. 10, 2020

(54) VISUAL MAPPING OF GEO-LOCATED TAGGED OBJECTS

(71) Applicant: Motorola Mobility LLC, Chicago, IL (US)

(72) Inventors: Yunming Wang, Buffalo Grove, IL (US); Miao Song, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 59 days.

(21) Appl. No.: 15/697,255

(22) Filed: Sep. 6, 2017

(65) Prior Publication Data

US 2019/0072390 A1    Mar. 7, 2019

(51) Int. Cl.
| | |
|---|---|
| H04W 4/00 | (2018.01) |
| G01C 21/00 | (2006.01) |
| H04W 4/021 | (2018.01) |
| G06T 17/05 | (2011.01) |
| G06K 19/07 | (2006.01) |
| G06K 7/10 | (2006.01) |
| G06T 19/00 | (2011.01) |
| H04W 8/00 | (2009.01) |

(52) U.S. Cl.
CPC ....... *G01C 21/005* (2013.01); *G06K 7/10386* (2013.01); *G06K 19/0723* (2013.01); *G06T 17/05* (2013.01); *G06T 19/006* (2013.01); *H04W 4/021* (2013.01); *G06T 2200/24* (2013.01); *H04M 2250/52* (2013.01); *H04W 8/005* (2013.01)

(58) Field of Classification Search
CPC ........ H04W 4/021; H04W 4/02; H04W 4/023
See application file for complete search history.

(56) References Cited

U.S. PATENT DOCUMENTS

| | | | |
|---|---|---|---|
| 9,589,255 B1* | 3/2017 | Sandrew | G06Q 10/1093 |
| 2003/0100326 A1* | 5/2003 | Grube | H04W 84/08 |
| | | | 455/515 |
| 2013/0091205 A1* | 4/2013 | Kotler | H04L 65/4015 |
| | | | 709/204 |

* cited by examiner

*Primary Examiner* — Omoniyi Obayanju
(74) *Attorney, Agent, or Firm* — SBMC (57) ABSTRACT

In aspects of visual mapping of geo-located tagged objects, a mobile device includes a mapping module that receives map data of a geo-fenced area from a controller device of the geo-fenced area. The mobile device can scan for wireless-enabled devices within a geo-fenced area, and receive a designation input of a tagged object that corresponds to one of the wireless-enabled devices. The mapping module is implemented to generate a visual mapping that displays a route from the mobile device to the tagged object based on the map data. The mapping module can receive object metadata about the tagged object as the mobile device approaches the tagged object along the route of the visual mapping, and a 3D visual representation of the tagged object is displayed based on a received 3D object model of the tagged object.

20 Claims, 6 Drawing Sheets

VISUAL MAPPING OF GEO-LOCATED TAGGED OBJECTS

BACKGROUND

Wireless tags used for wireless radio-signaling, such as radio frequency identification (RFID) tags or labels, can include memory to store data that identifies a wireless tag, as well as other information about an object that the wireless tag may be associated with. A wireless tag may be attached to an object or included in object packaging. Conventional systems used for localizing an object associated with a RFID tag involves using multiple stationary RFID readers with high power antennas to triangulate the position of the wireless tag. This type of RFID tracking system is not cost effective to implement, difficult to scale, and requires complex setup. Similarly, conventional augmented reality (AR) systems are difficult to implement due to operating in the visual domain, needing a line-of-sight to ascertain a real object and the position of the object in an augmented reality environment.

BRIEF DESCRIPTION OF THE DRAWINGS

Aspects of visual mapping of geo-located tagged objects are described with reference to the following Figures. The same numbers may be used throughout to reference similar features and components that are shown in the Figures.

DETAILED DESCRIPTION

Visual mapping of geo-located tagged objects is described, and may be implemented by a mobile device that includes a radio frequency identification (RFID) reader, such as a mobile phone that includes the RFID reader either as an integrated component or as an attachment that operates with the mobile phone. As a user of the mobile phone carries the device, entry into a geo-fenced area can be detected, such as by the mobile phone and/or by a controller device of the geo-fenced area. Generally, a geo-fenced area can be established as a virtual perimeter around a boundary of any structure or environment, such as any type of retail store that a person may enter looking for an item to purchase, a warehouse that a person may enter looking for a stocked item, a library, a grocery store, an airport terminal where a person will look to pick up his or her luggage and then retrieve a vehicle from the parking lot, and any other type of scenario where a person may seek to locate an item or an object of interest in an environment.

When entry into a geo-fenced area is detected, the mobile phone can initiate scanning in the geo-fenced area for wireless-enabled devices, such as wireless radio-based tags, Internet-of-things (IoT) network devices, Wi-Fi connected devices, and/or additional mobile devices. The wireless radio-based tags can include RFID tags that each correspond to respective items and/or objects in the geo-fenced area. The various tagged objects can be identified from the scanning by the mobile phone, and the identified tagged objects can be displayed for user selection on an integrated display device of the mobile phone. Alternatively or in addition, the controller device of the geo-fenced area may provide tagged objects location data to the mobile phone, and the inventory of tagged objects can be displayed for user selection on the display device of the mobile phone. For example, the user of the mobile phone may enter a retail store as identified by a geo-fenced area searching for a particular product to purchase. Various products may be displayed on the display device of the mobile phone for user selection as the identified tagged objects, and the user can select one of the products with a designation input, such as on a touch-enabled display device.

The mobile phone can receive map data of the geo-fenced area from the controller device of the geo-fenced area, and a mapping module of the mobile phone is implemented to determine a route from the mobile phone to the tagged object based on the map data of the geo-fenced area. The mapping module can also generate a visual mapping that displays the determined map route from the mobile phone to an indicator of the tagged object based on the map data of the geo-fenced area and the determined route in the visual mapping. As the user of the mobile phone follows the map route of the visual mapping that is displayed on the device and approaches the tagged object in the geo-fenced area, the mobile phone enters into RFID read range. The RFID tag that corresponds to the tagged object can then be interrogated by the RFID reader of the mobile phone to request the object metadata about the tagged object, and the RFID reader receives the object metadata from the RFID tag that is associated with the tagged object. The mobile phone can then request and receive a three-dimensional (3D) object model of the tagged object from the controller device of the geo-fenced area.

Additionally, as the user of the mobile phone follows the visual mapping that is displayed on the device and approaches the tagged object in the geo-fenced area, a camera of the mobile phone can be activated to display a region of the geo-fenced area on the display device of the mobile phone. The region of the geo-fenced area that is displayed on the mobile phone is the environment as captured by the camera and displayed for user viewing of the camera perspective. For example, the display on the mobile phone can transition from displaying the visual mapping to displaying what the camera captures along with a 3D visual representation of the tagged object displayed over the region of the geo-fenced area. These features are effective to generate a 3D visual display of the tagged object based on RFID tag location information, and the tagged object is recognized based on the RFID tag information.

While features and concepts of visual mapping of geo-located tagged objects can be implemented in any number of different devices, systems, environments, and/or configurations, aspects of visual mapping of geo-located tagged objects are described in the context of the following example devices, systems, and methods.

Figure 1:
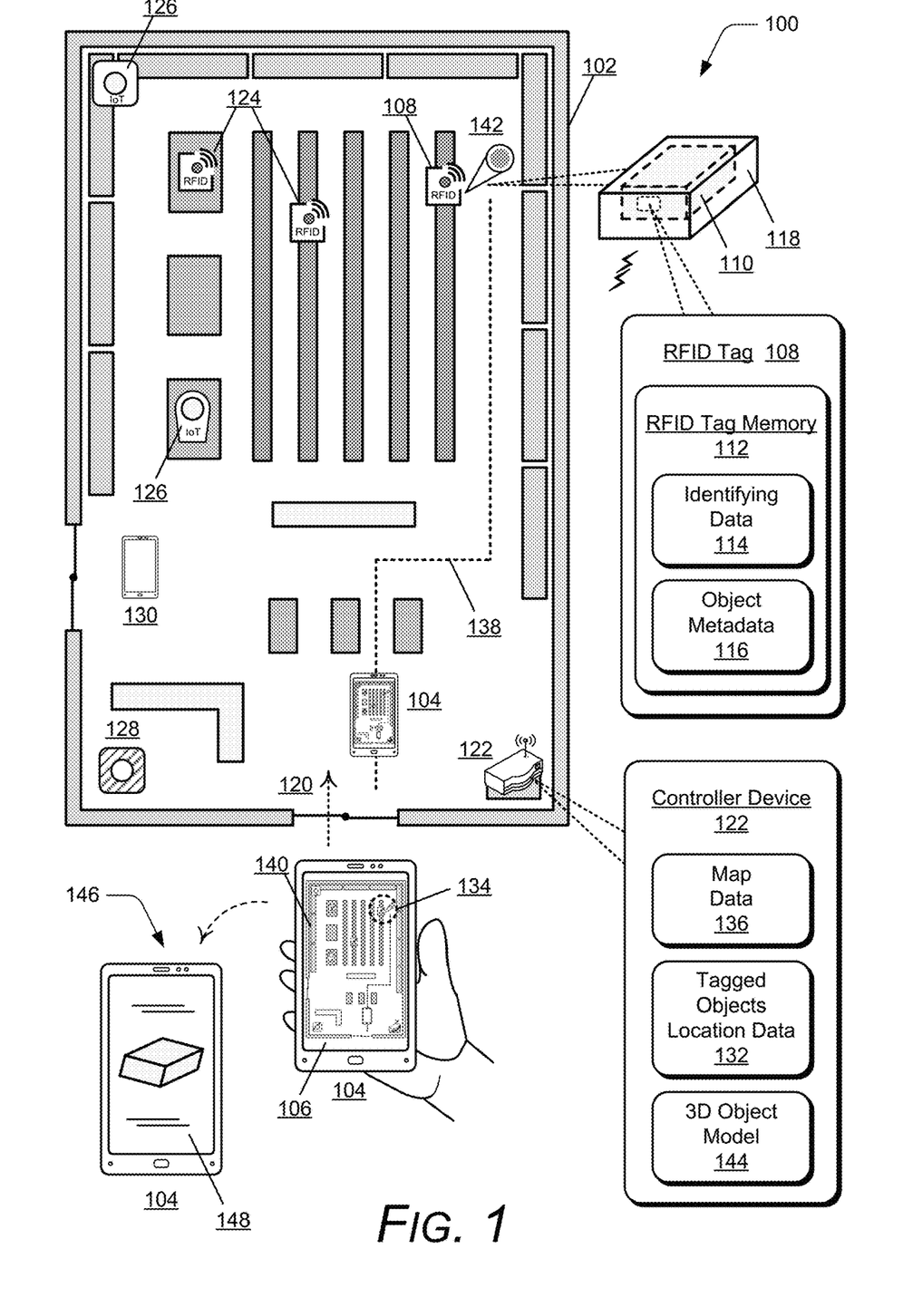
FIG. 1 illustrates an example environment in which aspects of visual mapping of geo-located tagged objects can be implemented.

FIG. 1 illustrates an example environment 100 in which aspects of visual mapping of geo-located tagged objects can be implemented. The example environment 100 includes a geo-fenced area 102, such as any type of retail store or warehouse that a person may enter looking for an item or object. Generally, a geo-fenced area can be established as a virtual perimeter around a boundary of any structure or environment, such as a building, an area of a building, a retail store, a warehouse, an airport terminal, a parking lot, an outdoor region, or any other environment or designated area. In this example environment 100, a user of a mobile phone 104 carries the device into the geo-fenced area 102. The mobile phone 104 is an example of any type of mobile device, such as the mobile device 202 shown and described with reference to FIG. 2.

In this example environment 100, the mobile phone 104 includes an integrated display device 106, a camera, and a radio frequency identification (RFID) reader implemented to transmit interrogation signals as broadcast messages requesting RFID tags that are in range to return identifying data stored in memory of the RFID tags. An RFID tag can receive an interrogation signal from the RFID reader and then wirelessly communicate the identifying data back to the RFID reader as an identification response. Generally, RFID tags are small electronic tags or labels that can be programmed with data and other information stored in memory on a RFID tag, and RFID tags can be associated with any type of object or item, such as by being placed in or affixed to an object for inventory tracking, item location, item recovery, and the like.

As a retail store or warehouse, the geo-fenced area 102 can include any number of inventoried items and objects, each of which can be identified and tracked with a RFID tag 108. The RFID tag 108 is associated with an object 110 within the geo-fenced area 102, and has RFID tag memory 112 that stores identifying data 114 as a unique identifier of the particular RFID tag, as well as object metadata 116 that identifies the respective tagged object 110 associated with the RFID tag 108. The object metadata 116 can also include location data of the tagged object 110. In this example, the RFID tag 108 is shown attached to the tagged object 110, which itself is stored in the geo-fenced area 102 in packaging 118. Even though the tagged object 110 is packaged and not readily visible, the object can be specifically located by the associated RFID tag 108.

As noted above, a user of the mobile phone 104 may carry the device into the geo-fenced area 102, and entry 120 into the geo-fenced area is detected. In an implementation, the mobile phone 104 can detect that it has entered the geo-fenced area 102, such as if the device was previously setup to register in the geo-fenced area. The mobile phone 104 can then initiate scanning in the geo-fenced area 102 for wireless-enabled devices, such as wireless radio-based tags, Internet-of-things (IoT) network devices, Wi-Fi connected devices, and/or additional mobile devices. Alternatively or in addition, a controller device 122 of the geo-fenced area 102 can detect the entry 120 of the mobile phone 104 into the geo-fenced area 102 and communicate a notice to the mobile phone, which then initiates the scanning for the wireless-enabled devices in the geo-fenced area.

The wireless radio-based tags can include the RFID tag 108, as well as any number of additional RFID tags 124 that each corresponds to respective items and/or objects in the geo-fenced area 102. Additionally, the wireless-radio based tags can include various different radio-based, wireless tag signaling, such as with LTE, Near Field Communication (NFC), Real-time Locating System (RTLS), Bluetooth™ devices, and the like. The IoT devices 126 can include motion sensors 128, camera devices, monitoring devices, control devices, and any other type of networked computing and/or electronic devices. Additionally, other mobile devices 130 of other users may be detected within the geo-fenced area 102.

The various tagged objects, such as the tagged object 110, that are each associated with a respective one of the wireless-enabled devices can be identified from the scanning by the mobile phone 104, and the identified tagged objects can be displayed for user selection on the integrated display device 106 of the mobile phone 104. Alternatively or in addition, the controller device 122 of the geo-fenced area 102 may provide tagged objects location data 132 to the mobile phone 104, and the inventory of tagged objects can be displayed for user selection on the display device 106 of the mobile phone 104. For example, the user of the mobile phone 104 may enter the retail store or warehouse as identified by the geo-fenced area 102 searching for a particular product to purchase. Various products may be displayed on the display device 106 of the mobile phone 104 for user selection as the identified tagged objects, and the user can select one of the products with a designation input 134 on the display, such as on a touch-enabled display device.

The mobile phone 104 can receive map data 136 of the geo-fenced area 102 from the controller device 122 of the geo-fenced area, and the mobile phone 104 can then determine a route 138 from the mobile phone to the tagged object 110 based on the map data 136 of the geo-fenced area. The mobile phone 104 can also generate a visual mapping 140 that displays the route 138 from the mobile phone to an indicator 142 of the tagged object 110 based on the map data of the geo-fenced area 102 and the determined route in the visual mapping.

As the user of the mobile phone 104 follows the route 138 of the visual mapping 140 that is displayed on the device and approaches the tagged object 110 in the geo-fenced area 102, the mobile phone 104 enters into RFID read range. The RFID tag 108 that corresponds to the tagged object 110 can then be interrogated by the RFID reader of the mobile phone to request the object metadata 116 stored in the RFID tag memory 112 on the RFID tag. The RFID tag 108 can receive an interrogation signal from the RFID reader of the mobile phone 104 and then wirelessly communicate the identifying data 114 and the object metadata 116 back to the RFID reader. The mobile phone 104 can then request and receive a three-dimensional (3D) object model 144 of the tagged object 110 from the controller device of the geo-fenced area 102. The 3D object model 144 of the tagged objects in the geo-fenced area 102 can be stored in a database that is accessible to the controller device.

Additionally, as the user of the mobile phone 104 follows the visual mapping 140 that is displayed on the device and approaches the tagged object 110 in the geo-fenced area 102, the camera of the mobile phone 104 is activated to display a region of the geo-fenced area on the display device 106 of the mobile phone 104. The region of the geo-fenced area 102 that is displayed on the display device 106 of the mobile phone is the environment as captured by the camera and displayed for user viewing of the camera perspective. For example, as shown at 146, the display on the mobile phone 104 transitions from displaying the visual mapping 140 to displaying what the camera captures along with a 3D visual representation 148 of the tagged object 110 displayed over the region of the geo-fenced area. The location of the tagged object 110 in the region of the geo-fenced area 102 can also be displayed on the display device. The 3D visual representation 148 can also provide for interactive operations on the displayed 3D visual representation of the tagged object 110, such as zoom-in, zoom-out, rotate, click, etc. on the 3D visual representation of the tagged object. The 3D visual representation 148 of the tagged object 110 that is displayed on the display device 106 of the mobile phone 104 is effective to provide the user a view of the object, even if the tagged object 110 is contained in packaging 118 or otherwise obstructed from view by other items, inventory, or objects.

Figure 2:
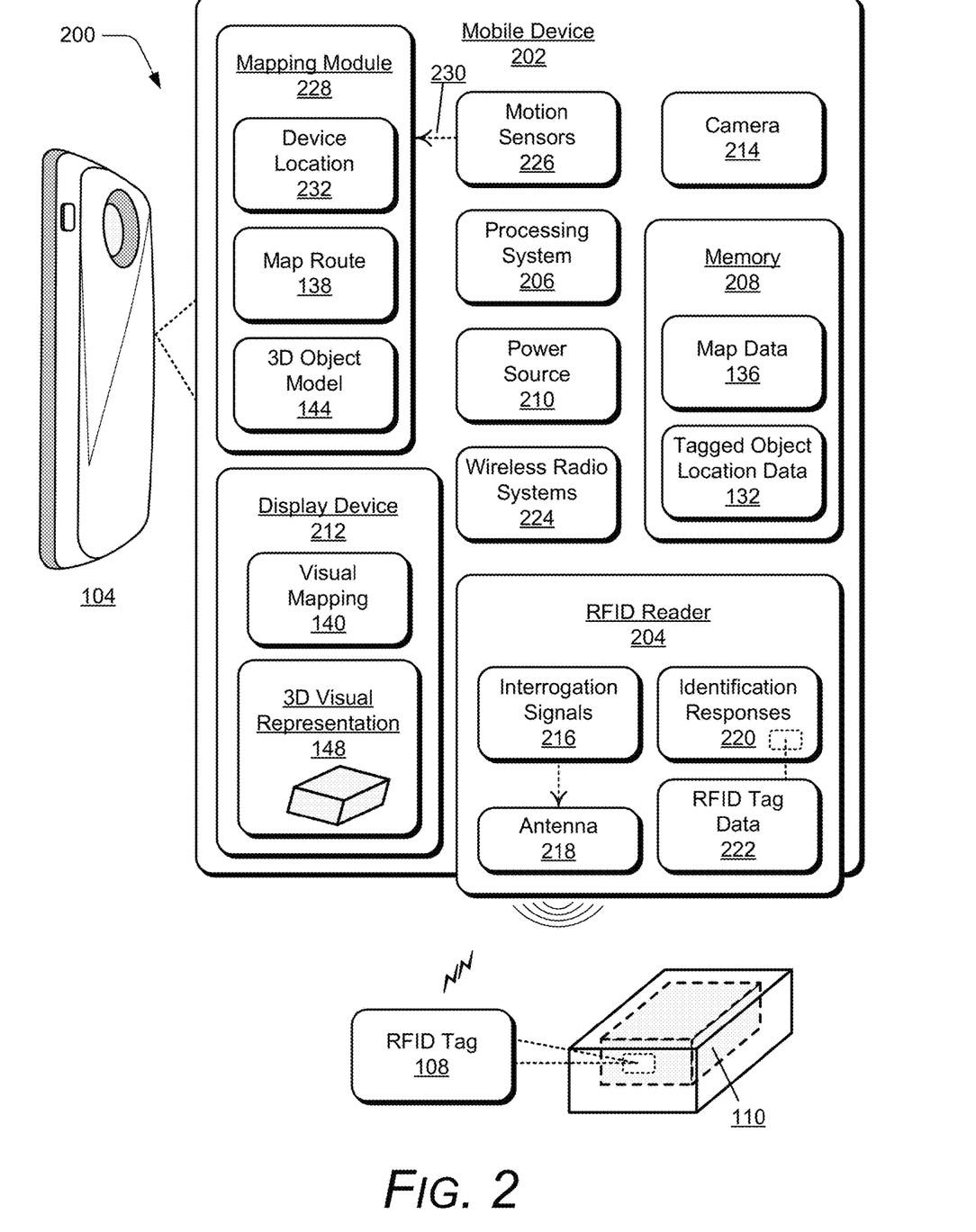
FIG. 2 illustrates an example system for visual mapping of geo-located tagged objects in accordance with one or more implementations described herein.

FIG. 2 illustrates an example system 200 in which aspects of visual mapping of geo-located tagged objects can be implemented. The example system 200 includes any type of a mobile device 202, such as a tablet device or the mobile phone 104 shown and described with reference to FIG. 1, that includes a radio frequency identification (RFID) reader 204, either as an integrated component of the mobile device 202 or as an attachment that operates with the mobile device. Generally, the mobile device 202 is any type of an electronic and/or computing device implemented with various components, such as a processing system 206 and memory 208, as well as any number and combination of different components as further described with reference to the example device shown in FIG. 6. For example, the mobile device 202 can include a power source 210 to power the device, such as a rechargeable battery and/or any other type of active or passive power source that may be implemented in an electronic and/or computing device. The mobile device 202 can also include an integrated display device 212 and a camera 214.

The example system 200 can include any number of RFID tags, such as the RFID tag 108, which has the RFID tag memory 112 that stores the identifying data 114 as a unique identifier of the particular RFID tag, and the object metadata 116 that identifies the respective tagged object 110 associated with the RFID tag 108. The RFID tag 108 is implemented for two-way wireless communication with the RFID reader 204 (also referred to as a RFID interrogator) that interrogates the RFID tag 108 for the identifying data 114 and the object metadata 116 stored in the RFID tag memory 112. The RFID reader 204 can transmit interrogation signals 216 via an antenna 218 (or antenna system) as broadcast messages requesting RFID tags that are in range to return the tag data stored in memory of the RFID tags. The antenna 218 may be a directional antenna or an omnidirectional antenna, usable by the RFID reader 204 to transmit the interrogation signals 216 to RFID tags.

The RFID tag 108 can receive an interrogation signal 216 from the RFID reader 204 and then wirelessly communicate the identifying data 114 and the object metadata 116 back to the RFID reader via a radio frequency (RF) communication channel, which the RFID reader 204 receives as identification responses 220. The identification responses 220 from the RFID tag 108 include the RFID tag data 222 (e.g., the identifying data 114 and the object metadata 116) stored in the RFID tag memory 112. Generally, the RFID tag 108 (and other RFID tags described herein) includes a RFID antenna and a RF interface as a transceiver for two-way communication with the RFID reader 204. In response to receipt of an interrogation signal 216 from the RFID reader 204, an ASIC/CPU module of the RFID tag 108 formulates a response that includes the identifying data 114 and the object metadata 116 from the RFID tag, and the response is wirelessly transmitted to the RFID reader. The identification responses 220 received by the RFID reader 204 from the RFID tag 108 can be communicated using low frequency (LF), high frequency (HF), or ultra-high frequency (UHF) radio waves.

In addition to the RFID implementation, the mobile device 202 can include various, different wireless radio systems 224, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile device 202 implements the wireless radio systems 224 that each include a radio device, antenna, and chipset implemented for cellular, wireless, and/or other network communication with other devices, networks, and services. A wireless radio system 224 can be configured to implement any suitable communication protocol or standard. Although features and aspects of visual mapping of geo-located tagged objects are described and illustrated in the context of RFID tags, the described features and aspects can be implemented with various radio-based, wireless tag signaling, such as with LTE, NFC, RTLS, Bluetooth™ devices, and the like.

The mobile device 202 includes motion sensors 226 (or a single motion sensor) to sense motion of the mobile device 202 as a user moves and changes orientations of the device and/or as the device moves with the user to various different locations. The motion sensors 226 can be implemented with various sensors, such as a gyroscope, an accelerometer, and/or other types of motion sensors to sense motion of the mobile device. The various motion sensors 226 may also be implemented as components of an inertial measurement unit in the mobile device. The motion sensors 226 generate sensor data vectors having three-dimensional parameters (e.g., rotational vectors in x, y, and z coordinates) indicating position, location, and/or orientation of the mobile device 202. For example, a user of the mobile device 202 may hold the device in any orientation, such as vertical (perpendicular) as shown in the figure, horizontal (parallel), or at any other angle and rotational orientation.

The mobile device 202 includes a mapping module 228 that implements features of visual mapping of geo-located tagged objects, as described herein. The mapping module 228 may include independent processing, memory, and logic components functioning as a computing and/or electronic device integrated with the mobile device 202. Alternatively or in addition, the mapping module 228 can be implemented as a software application or software module, such as computer-executable software instructions that are executable with a processor (e.g., with the processing system 206). As a software application, the mapping module 228 can be stored on computer-readable storage memory (e.g., the memory 208), or any suitable memory device or electronic data storage implemented with the tracking module.

The mapping module 228 receives motion sensor inputs 230 from the motion sensors 226, which are an indication that the mobile device 202 is changing orientation in three-dimensional space and/or changing locations as the device moves with a user of the device. The mapping module 228 is implemented to track movement of the mobile device 202 based on the motion sensor inputs 230 and can identify a device location 232 of the mobile device relative to the environment in which the mobile device is located. The mapping module 228 can also initiate the RFID reader 204 to begin scanning for RFID tags by transmitting the interrogation signals 216 based on the mobile device 202 detecting entry into the geo-fenced area 102.

The tagged object 110 that is associated with the RFID tag 108 can be identified from the scanning by the mobile device 202, and the identified tagged object 110 can be displayed for user selection on the integrated display device 212 of the mobile device 202. Alternatively or in addition, the controller device 122 of the geo-fenced area 102 may provide the tagged objects location data 132 to the mobile device 202, (e.g., stored in device memory 208) and the inventory of tagged objects can be displayed for user selection on the display device 212 of the mobile device 202.

The direction and/or location of the tagged object 110 (e.g., a RFID tagged object) can be mapped and displayed on the integrated display device 212 of the mobile device 202, such as to indicate where the tagged object 110 that is associated with the RFID tag 108 is located relative to the mobile device 202 in an environment in which the tagged object and the mobile device are located. For example, the mapping module 228 can generate an object location mapping of an augmented reality environment, where real objects in the environment are mapped according to their relative location based on the determined visual mapping of geo-located tagged objects associated with each of the respective objects in the environment of the geo-fenced area 102.

The mobile device 202 can also receive the map data 136 of the geo-fenced area 102 from the controller device 122 of the geo-fenced area (e.g., stored in device memory 208), and the mapping module 228 is implemented to determine the map route 138 from the mobile device to the tagged object 110 based on the map data 136 of the geo-fenced area. The mapping module 228 can also generate the visual mapping 140 that displays the map route 138 from the mobile device to the indicator 142 of the tagged object 110 based on the map data of the geo-fenced area 102 and the determined map route 138 in the visual mapping.

As the user of the mobile device 202 follows the visual mapping 140 that is displayed on the device and approaches the tagged object 110 in the geo-fenced area 102, the mobile device 202 enters into RFID read range. The RFID tag 108 that corresponds to the tagged object 110 can then be interrogated by the RFID reader 204 of the mobile device to request the object metadata 116 stored in the RFID tag memory 112 on the RFID tag. The RFID tag 108 can receive an interrogation signal 216 from the RFID reader 204 of the mobile device 202 and then wirelessly communicate the identifying data 114 and the object metadata 116 back to the RFID reader. The mobile device 202 can then request and receive the three-dimensional (3D) object model 144 of the tagged object 110 from the controller device 122 of the geo-fenced area 102.

Additionally, as the user of the mobile device 202 follows the visual mapping 140 that is displayed on the device and approaches the tagged object 110 in the geo-fenced area 102, the camera 214 of the mobile device 202 can be activated to display a region of the geo-fenced area on the display device 212 of the mobile device. For example, the display on the mobile device 202 transitions from displaying the visual mapping 140 to displaying what the camera captures along with the 3D visual representation 148 of the tagged object 110 displayed over the region of the geo-fenced area based on the received 3D object model 144. The location of the tagged object 110 in the region of the geo-fenced area 102 can also be displayed on the display device. The 3D visual representation 148 of the tagged object 110 that is displayed on the display device 212 of the mobile device 202 is effective to provide the user a view of the object.

Figure 3:
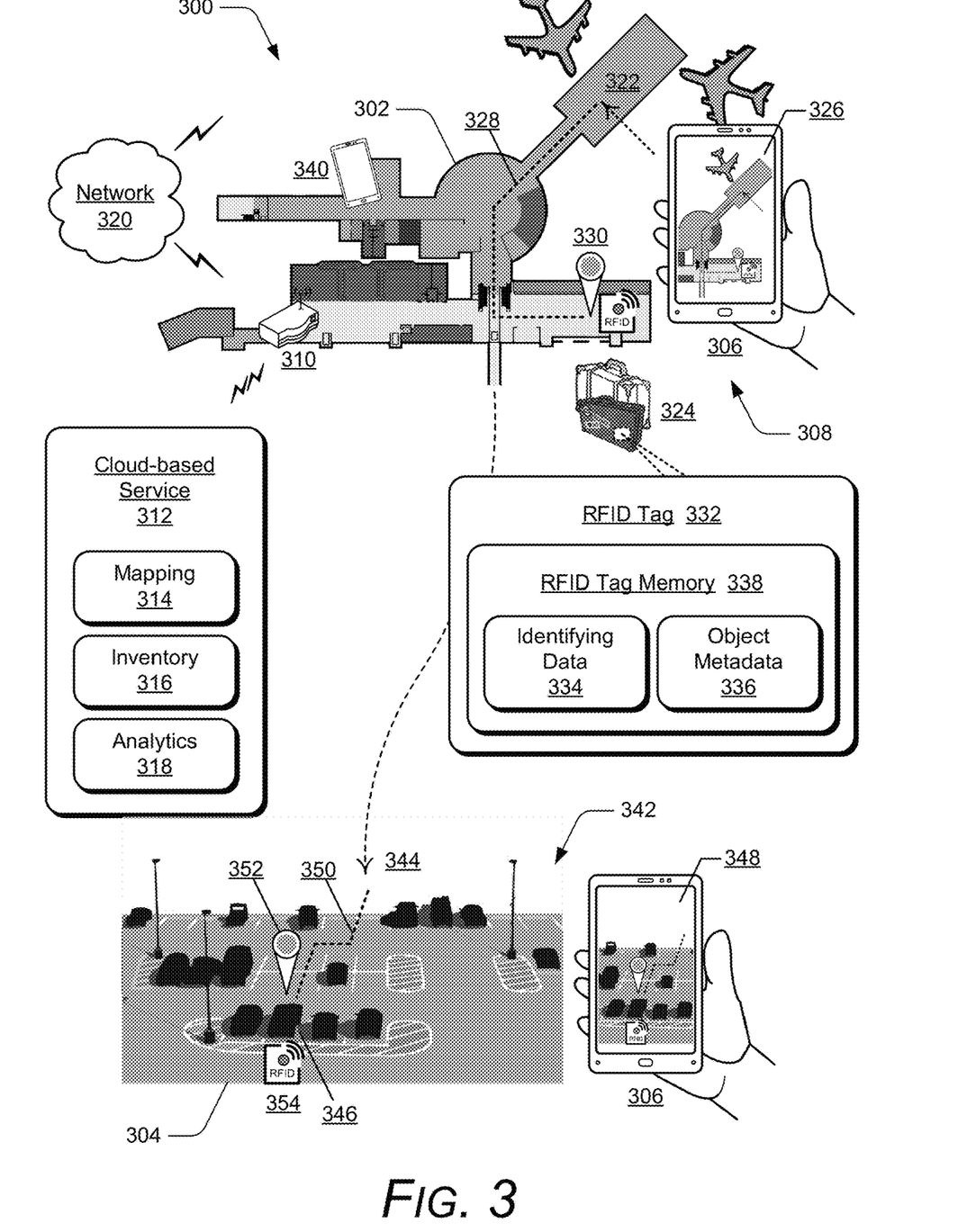
FIG. 3 illustrates an example environment in which aspects of visual mapping of geo-located tagged objects can be implemented.

FIG. 3 illustrates an example environment 300 in which aspects of visual mapping of geo-located tagged objects can be implemented. The example environment 300 includes a geo-fenced area 302, shown as an airport terminal in this example, and includes a geo-fenced area 304, shown as a parking lot outside of the airport terminal. In this example environment 300, a user of a mobile phone 306 carries the device off a plane at 308 and into the airport terminal (e.g., the geo-fenced area 302). The mobile phone 306 is an example of any type of mobile device, such as described with reference to the mobile device 202 shown in FIG. 2, and the mobile phone 306 can include the RFID reader 204 either as an integrated component of the mobile phone 306 or as an attachment that operates with the mobile phone.

Additionally, the example environment 300 includes a controller device 310 of the geo-fenced areas 302, 304, such as the controller device shown located in the airport terminal. Although described and shown with the single controller device 310, each of the different geo-fenced areas may be implemented with an independent controller device, or more than one controller device. Additional features of visual mapping of geo-located tagged objects may be implemented by a cloud-based service 312, as shown in this example environment 300. The controller device 310 of a geo-fenced area can communicate with the cloud-based service 312 that provides a database and can implement features of mapping 314, such as to generate the visual mappings of geo-fenced areas; features of inventory 316, such as for retail and warehouse inventory control; and various features of data analytics 318. The controller device 310, the cloud-based service 312, and any of the mobile devices described herein can communicate via a network 320.

The network 320 generally represents any type of communication and data network, and any of the servers and devices described herein can communicate via the network 320 (or combination of networks), such as for data communication between the mobile phone 306, the controller device 310, and/or a server of the cloud-based service 312. The network 320 can be implemented to include a wired and/or wireless network. The network 320 can also be implemented using any type of network topology and/or communication protocol, and can be represented or otherwise implemented as a combination of two or more networks, to include cellular networks, IP-based networks, and/or the Internet. The network 320 may also include mobile operator networks that are managed by a network provider of a cellular network, a mobile network operator, and/or other network operators, such as a communication service provider, mobile phone provider, and/or Internet service provider.

As noted above, a user of the mobile phone 306 may carry the device into the geo-fenced area 302, and entry 322 into the geo-fenced area is detected as the user of a mobile phone 306 carries the device off a plane at 308 and into the airport terminal. In an implementation, the controller device 310 of the geo-fenced area 302 can detect the mobile phone 306 and communicate the map data 136 of the airport terminal to the mobile phone. Alternatively or in addition, the mapping module 228 of the mobile phone 306 can detect the entry 322 into the geo-fenced area 302. The mobile phone 306 can then communicate to the controller device 310 to request the map data 136, which the controller device then communicates to the mobile phone. Additionally, as the user's luggage from the recent flight enters baggage claim in the airport terminal, the controller device 310 of the geo-fenced area 302 can detect that the luggage is a tagged object 324 corresponding to the mobile phone 306 of the user.

The mobile phone 306 can then receive the tagged objects location data 132 from the controller device 310 for the tagged objects that correspond to the mobile phone 306, such as the luggage which is tagged object 324 located within the geo-fenced area 302 (e.g., the airport terminal). The user of the mobile phone 306 can initiate a selection from the display to locate his or her luggage once entering the airport terminal. The mapping module 228 of the mobile phone 306 is implemented to generate a visual mapping 326 of the geo-fenced area 302 for display on the mobile phone. The visual mapping 326 includes a determined map route 328 through the airport terminal from the mobile phone 306 to an indicator 330 of the tagged object 324 at baggage claim so that the user can locate the luggage.

As the user of the mobile phone 306 follows the route 328 of the visual mapping 326 that is displayed on the device and approaches the tagged object 324 in the geo-fenced area 302, the mobile phone 306 enters into RFID read range. In the geo-fenced area 302, the RFID tag 332 that corresponds to the tagged object 324 (e.g., the luggage) is interrogated by the RFID reader 204 of the mobile phone 306 to request the identifying data 334 of the RFID tag, as well as the object metadata 336 stored in the RFID tag memory 338 about the luggage. The RFID tag 332 receives the interrogation signal 216 from the RFID reader 204 of the mobile phone 306 and then wirelessly communicates the identifying data 334 and the object metadata 336 about the luggage back to the RFID reader, and the RFID tag data 222 (e.g., the identifying data and the object metadata) is received by the mobile phone.

Further, as the user of the mobile phone 306 follows the route 328 of the visual mapping 326 that is displayed on the device and approaches the tagged object 324 in the geo-fenced area 302, the camera 214 of the mobile phone 306 is activated to display a region of the geo-fenced area 302, such as the baggage claim area in the airport terminal, on the display device of the mobile phone 306. The region of the geo-fenced area 302 that is displayed on the display device of the mobile phone 306 is the environment as captured by the camera and displayed for user viewing of the camera perspective.

The mapping module 228 of the mobile phone 306 can request and receive the 3D object model 144 of the tagged object 324 from the controller device 310 of the geo-fenced area 302. A 3D visual representation of the tagged object 324 (e.g., the luggage) can then be displayed over the displayed region on the display device of the mobile phone 306 based on the received 3D object model of the tagged object. The display device on the mobile phone 306 transitions from displaying the visual mapping 326 to displaying what the camera captures along with the 3D visual representation of the luggage displayed over the region of the geo-fenced area, such as in the baggage claim area of the airport terminal.

In an implementation, the mobile phone 306 may also be associated with another mobile device 340, such as belonging to a traveling companion of the user with the mobile phone 306. In the described airport example, the user with the mobile phone 306 may be near the baggage claim to retrieve the luggage, while the traveling companion with the mobile device 340 is in another part of the airport terminal. The user can initiate the mobile phone 306 sharing information with the mobile device 340, such as a 3D visual representation of the traveling companion's bag so that the user can retrieve the bag from baggage claim for the traveling companion. The mobile phone 306 may communicate a display of the baggage claim area with images of the luggage so that the user of the mobile phone 306 can confirm having the correct bag for the traveling companion. This feature of visual mapping of geo-located tagged objects can be used in any environment to share real-time, visual aspects of a region of a geo-fenced area between devices. Further, the communications and images between the various mobile devices can be customized based on user preferences to display information in a selected language and in accordance with other user preferences.

Additionally, the mapping module 228 of the mobile phone 306 can generate a visual mapping from the mobile phone 306 in the baggage claim area to the mobile device 340 of the traveling companion so that the user of the mobile phone can locate the other person. The user of the mobile phone 306 may then exit the airport terminal, carrying the device into the geo-fenced area 304 as shown at 342, and entry 344 into the geo-fenced area 304 is detected as the user of a mobile phone 306 carries the device into the parking lot. The controller device 310 of the geo-fenced area 304 can detect the mobile phone 306 and communicate the map data 136 of the parking lot to the mobile phone. Alternatively or in addition, the mapping module 228 of the mobile phone 306 can detect the entry 344 into the geo-fenced area 304, and the mobile phone 306 communicates with the controller device 310 to request the map data 136, which the controller device 310 then communicates to the mobile phone. Additionally, the controller device 310 of the geo-fenced area 304 associates that the vehicle is a tagged object 346 corresponding to the mobile phone 306 of the user.

The mobile phone 306 can then receive the tagged objects location data 132 from the controller device 310 for the tagged objects that correspond to the mobile phone 306, such as the vehicle which is the tagged object 346 located within the geo-fenced area 304 (e.g., the parking lot). The user of the mobile phone 306 can initiate a selection from the display to locate his or her vehicle when or after exiting the airport terminal and traveling toward the parking lot. The mapping module 228 of the mobile phone 306 is implemented to generate a visual mapping 348 of the geo-fenced area 302 for display on the mobile phone. The visual mapping 348 includes a determined map route 350 through the parking lot from the mobile phone 306 to an indicator 352 of the tagged object 346 in the parking lot so that the user can locate the vehicle.

As the user of the mobile phone 306 follows the route 350 of the visual mapping 348 that is displayed on the device and approaches the tagged object 346 in the geo-fenced area 304, the mobile phone 306 enters into RFID read range. In the geo-fenced area 304, the RFID tag 354 that corresponds to the tagged object 346 (e.g., the vehicle) is interrogated by the RFID reader 204 of the mobile phone 306 to request the identifying data of the RFID tag, as well as the object metadata stored in the RFID tag memory about the vehicle. The RFID tag 354 receives the interrogation signal 216 from the RFID reader 204 of the mobile phone 306 and then wirelessly communicates the identifying data and the object metadata about the vehicle back to the RFID reader, and the RFID tag data 222 is received by the mobile phone.

Further, as the user of the mobile phone 306 follows the route 350 of the visual mapping 348 that is displayed on the device and approaches the tagged object 346 in the geo-fenced area 304, the camera 214 of the mobile phone 306 is activated to display a region of the geo-fenced area 304, such as the area of the parking lot in which the vehicle is parked, on the display device of the mobile phone 306. The region of the geo-fenced area 304 that is displayed on the display device of the mobile phone 306 is the environment as captured by the camera and displayed for user viewing of the camera perspective. The mapping module 228 of the mobile phone 306 can request and receive the 3D object model 144 of the tagged object 346 from the controller device 310 of the geo-fenced area 304. A 3D visual representation of the tagged object 346 (e.g., the vehicle) can then be displayed over the displayed region on the display device of the mobile phone 306 based on the received 3D object model of the tagged object.

Example methods 400 and 500 are described with reference to respective FIGS. 4 and 5 in accordance with implementations of visual mapping of geo-located tagged objects. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
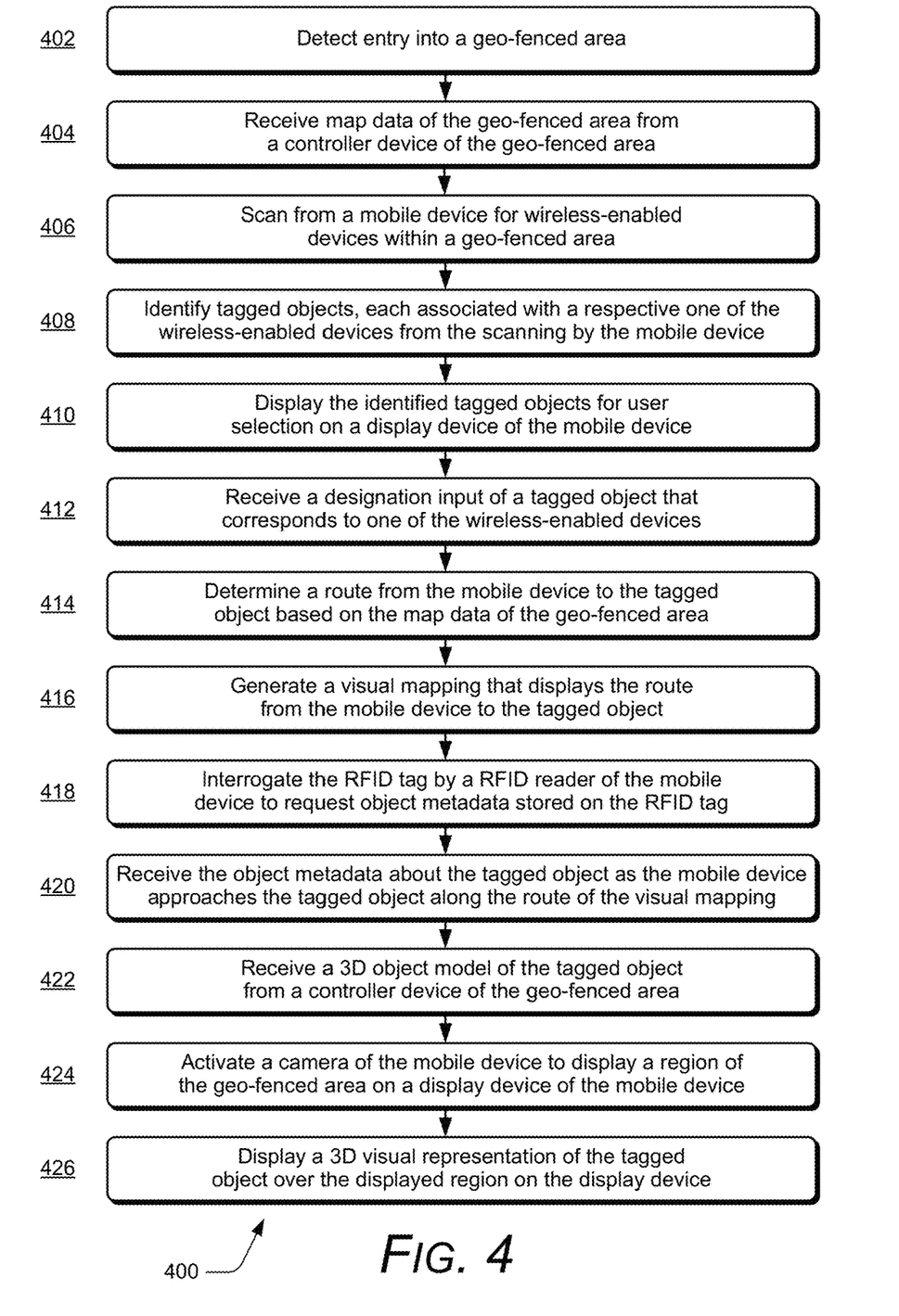
FIG. 4 illustrates an example method of visual mapping of geo-located tagged objects in accordance with one or more implementations described herein.

FIG. 4 illustrates example method(s) 400 of visual mapping of geo-located tagged objects as described herein, and the method is generally described with reference to a mobile device implemented for communication with a wireless tag that corresponds to a tagged object. The order in which the method is described is not intended to be construed as a limitation, and any number or combination of the described method operations can be performed in any order to perform a method, or an alternate method.

At 402, entry into a geo-fenced area is detected and, at 404, map data of the geo-fenced area is received from a controller device of the geo-fenced area. For example, the mobile phone 104 enters into the geo-fenced area 102, which is detected by the mobile phone 104 and/or by the controller device 122 of the geo-fenced area, such as when a user of the mobile phone 104 carries the device into a building, an airport, a parking lot, a geographical region, or any other type of environment that may be setup as a geo-fenced area. The mapping module 228 of the mobile phone 104 receives the map data 136 of the geo-fenced area 102 from the controller device 122 of the geo-fenced area.

At 406, a mobile device scans for wireless-enabled devices within the geo-fenced area. For example, the mobile phone 104 initiates scanning for the wireless-enabled devices in the geo-fenced area 102 responsive to the detected entry into the geo-fenced area, or based on receiving a notice communication from the controller device that detects the mobile device entry 120 into the geo-fenced area.

At 408, tagged objects are identified, each associated with a respective one of the wireless-enabled devices from the scanning by the mobile device. For example, the wireless-enabled devices can include wireless radio-based tags, Internet-of-things (IoT) network devices, Wi-Fi connected devices, and/or additional mobile devices. The tagged objects in the geo-fenced area 102 that are associated with a respective one of the wireless-enabled devices are identified from the scanning by the mobile phone 104.

At 410, the identified tagged objects are displayed for user selection on a display device of the mobile device and, at 412, a designation input is received of a tagged object that corresponds to one of the wireless-enabled devices. For example, the identified tagged objects are displayed for user selection on the integrated display device 106 of the mobile phone 104, such as if the controller device 122 of the geo-fenced area 102 provides the tagged objects location data 132 to the mobile phone 104, and the inventory of tagged objects is displayed for user selection on the display device 106 of the mobile phone 104. In implementations, the user of the mobile phone 104 may enter a retail store or warehouse as identified by the geo-fenced area 102 searching for a particular product to purchase. Various products may be displayed on the display device 106 of the mobile phone 104 for user selection as the identified tagged objects, and the user can select one of the products with a designation input 134 on the display, such as on a touch-enabled display device.

At 414, a route from the mobile device to the tagged object is determined based on the map data of the geo-fenced area. For example, the mapping module 228 of the mobile phone 104 determines the map route 138 from the mobile phone to the tagged object 110 based on the map data 136 of the geo-fenced area. At 416, a visual mapping is generated that displays the route from the mobile device to the tagged object. For example, the mapping module 228 of the mobile phone 104 generates the visual mapping 140 that displays the route 138 from the mobile phone to the indicator 142 of the tagged object 110 based on the map data of the geo-fenced area 102 and the determined map route 138 in the visual mapping.

At 418, the RFID tag is interrogated by a RFID reader of the mobile device to request object metadata stored on the RFID tag. For example, as the user of the mobile phone 104 follows the visual mapping 140 that is displayed on the device and approaches the tagged object 110 in the geo-fenced area 102, the mobile phone 104 enters into RFID read range and the RFID tag 108 that corresponds to the tagged object 110 is interrogated by the RFID reader 204 of the mobile phone to request the object metadata 116 stored in the RFID tag memory 112 on the RFID tag.

At 420, the object metadata about the tagged object is received as the mobile device approaches the tagged object along the route of the visual mapping. For example, the RFID tag 108 can receive the interrogation signal 216 from the RFID reader 204 of the mobile phone 104 and then wirelessly communicate the identifying data 114 and the object metadata 116 back to the RFID reader, and the RFID tag data 222 is received by the mobile phone.

At 422, a 3D object model of the tagged object is received from a controller device of the geo-fenced area. For example, the mapping module 228 of the mobile phone 104 requests and receives the three-dimensional (3D) object model 144 of the tagged object 110 from the controller device 122 of the geo-fenced area 102.

At 424, a camera of the mobile device is activated to display a region of the geo-fenced area on a display device of the mobile device. For example, as the user of the mobile phone 104 follows the visual mapping 140 that is displayed on the device and approaches the tagged object 110 in the geo-fenced area 102, the camera 214 of the mobile phone 104 is activated to display a region of the geo-fenced area on the display device 106 of the mobile phone 104. The region of the geo-fenced area 102 that is displayed on the display device 106 of the mobile phone is the environment as captured by the camera and displayed for user viewing of the camera perspective.

At 426, a 3D visual representation of the tagged object is displayed over the displayed region on the display device. For example, the display device 106 on the mobile phone 104 transitions at 146 from displaying the visual mapping 140 to displaying what the camera captures along with the 3D visual representation 148 of the tagged object 110 displayed over the region of the geo-fenced area based on the received 3D object model. The location of the tagged object 110 in the region of the geo-fenced area 102 can also be displayed on the display device 106 of the mobile phone 104. The 3D visual representation 148 of the tagged object 110 that is displayed on the display device 106 of the mobile phone 104 is effective to provide the user a view of the object, even if the tagged object 110 is contained in packaging 118 or otherwise obstructed from view by other items, inventory, or objects.

Figure 5:
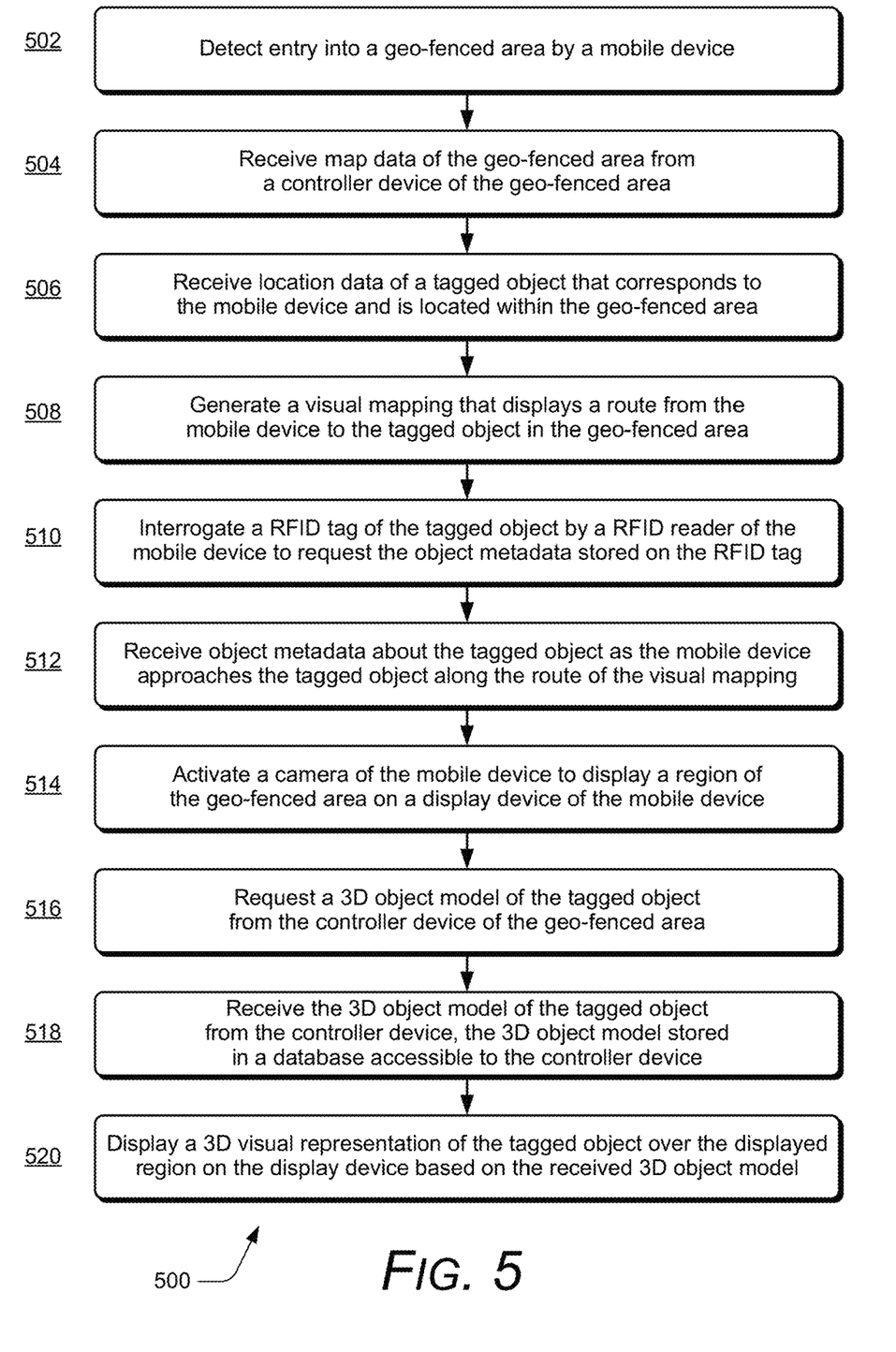
FIG. 5 illustrates an example method of visual mapping of geo-located tagged objects in accordance with one or more implementations described herein.

FIG. 5 illustrates example method(s) 500 of visual mapping of geo-located tagged objects as described herein, and the method is generally described with reference to a mobile device implemented for communication with a wireless tag that corresponds to a tagged object. The order in which the method is described is not intended to be construed as a limitation, and any number or combination of the described method operations can be performed in any order to perform a method, or an alternate method.

At 502, entry into a geo-fenced area is detected by a mobile device. For example, the mobile phone 306 detects entry of the device into the respective geo-fenced areas 302, 304, such as when a user of the mobile phone 306 carries the device into the airport terminal (e.g., geo-fenced area 302) and then into the parking lot (e.g., geo-fenced area 304) in the example environment 300 shown and described with reference to FIG. 3.

At 504, map data of the geo-fenced area is received from a controller device of the geo-fenced area. For example, the mobile phone 306 receives the map data 136 for the airport terminal and the parking lot from the controller device 310 of the respective geo-fenced areas 302, 304. The mobile phone 306 can communicate to the controller device 310 to request the map data, which the controller device then communicates to the mobile phone, or the controller device 310 can communicate the map data to the mobile phone 306 based on the detected entry of the device into the respective geo-fenced areas 302, 304.

At 506, location data of a tagged object that corresponds to the mobile device and is located within the geo-fenced area is received. For example, the mobile phone 306 receives the tagged objects location data 132 from the controller device 310 for the tagged objects that correspond to the mobile phone 306, such as the luggage which is tagged object 324 located within the geo-fenced area 302 (e.g., the airport terminal), and the vehicle which is tagged object 346 located within the geo-fenced area 304 (e.g., the parking lot).

At 508, a visual mapping is generated that displays a route from the mobile device to the tagged object in the geo-fenced area. For example, the mapping module 228 of the mobile phone 306 generates the visual mapping 326 of the geo-fenced area 302 showing the route 328 through the airport terminal from the mobile phone 306 to the tagged object 324 so that the user can locate the luggage. Similarly, the mapping module 228 generates the visual mapping 348 of the geo-fenced area 304 showing the route 350 through the parking lot from the mobile phone 306 to the tagged object 346 so that the user can locate the vehicle.

At 510, a RFID tag of the tagged object is interrogated by a RFID reader of the mobile device to request the object metadata stored on the RFID tag. For example, as the user of the mobile phone 306 follows the route 328 of the visual mapping 326 that is displayed on the device and approaches the tagged object 324 in the geo-fenced area 302, the mobile phone 306 enters into RFID read range. In the geo-fenced area 302, the RFID tag 332 that corresponds to the tagged object 324 is interrogated by the RFID reader 204 of the mobile phone 306 to request the object metadata 336 stored in the RFID tag memory 338 about the luggage. Similarly, as the user of the mobile phone 306 follows the route 350 of the visual mapping 348 that is displayed on the device and approaches the tagged object 346 in the geo-fenced area 304, the mobile phone 306 enters into RFID read range. In the geo-fenced area 304, the RFID tag 354 that corresponds to the tagged object 346 is interrogated by the RFID reader 204 of the of the mobile phone 306 to request the object metadata stored in the RFID tag memory about the vehicle.

At 512, object metadata about the tagged object is received as the mobile device approaches the tagged object along the route of the visual mapping. For example, the RFID tag 332 receives the interrogation signal 216 from the RFID reader 204 of the mobile phone 306 and then wirelessly communicates the identifying data 334 and the object metadata 336 about the luggage back to the RFID reader, and the RFID tag data 222 is received by the mobile phone. Similarly, the RFID tag 354 receives the interrogation signal 216 from the RFID reader 204 of the mobile phone 306 and then wirelessly communicates the identifying data and the object metadata about the vehicle back to the RFID reader, and the RFID tag data 222 is received by the mobile phone.

At 514, a camera of the mobile device is activated to display a region of the geo-fenced area on a display device of the mobile device. For example, as the user of the mobile phone 306 follows the route 328 of the visual mapping 326 that is displayed on the device and approaches the tagged object 324 the geo-fenced area 302, the camera 214 of the mobile phone 306 is activated to display a region of the geo-fenced area 302, such as the baggage claim area in the airport terminal, on the display device of the mobile phone 306. The region of the geo-fenced area 302 that is displayed on the display device of the mobile phone 306 is the environment as captured by the camera and displayed for user viewing of the camera perspective. Similarly, as the user of the mobile phone 306 follows the route 350 of the visual mapping 348 that is displayed on the device and approaches the tagged object 346 in the geo-fenced area 304, the camera 214 of the mobile phone 306 is activated to display a region of the geo-fenced area 304, such as the area of the parking lot where the vehicle is parked, on the display device of the mobile phone 306.

At 516, a 3D object model of the tagged object is requested from the controller device of the geo-fenced area and, at 518, the 3D object model of the tagged object is received from the controller device. For example, the mapping module 228 of the mobile phone 306 requests and receives the three-dimensional (3D) object models 144 of the tagged objects 324, 346 from the controller device 310 of the respective geo-fenced areas 302, 304.

At 520, a 3D visual representation of the tagged object is displayed over the displayed region on the display device based on the received 3D object model of the tagged object. For example, the display device on the mobile phone 306 transitions from displaying the visual mapping 326 to displaying what the camera captures along with the 3D visual representation of the luggage displayed over the region of the geo-fenced area 302 based on the received 3D object model of the luggage. Similarly, the display device on the mobile phone 306 transitions from displaying the visual mapping 348 to displaying what the camera captures along with the 3D visual representation of the vehicle displayed over the region of the geo-fenced area 304 based on the received 3D object model of the vehicle.

Figure 6:
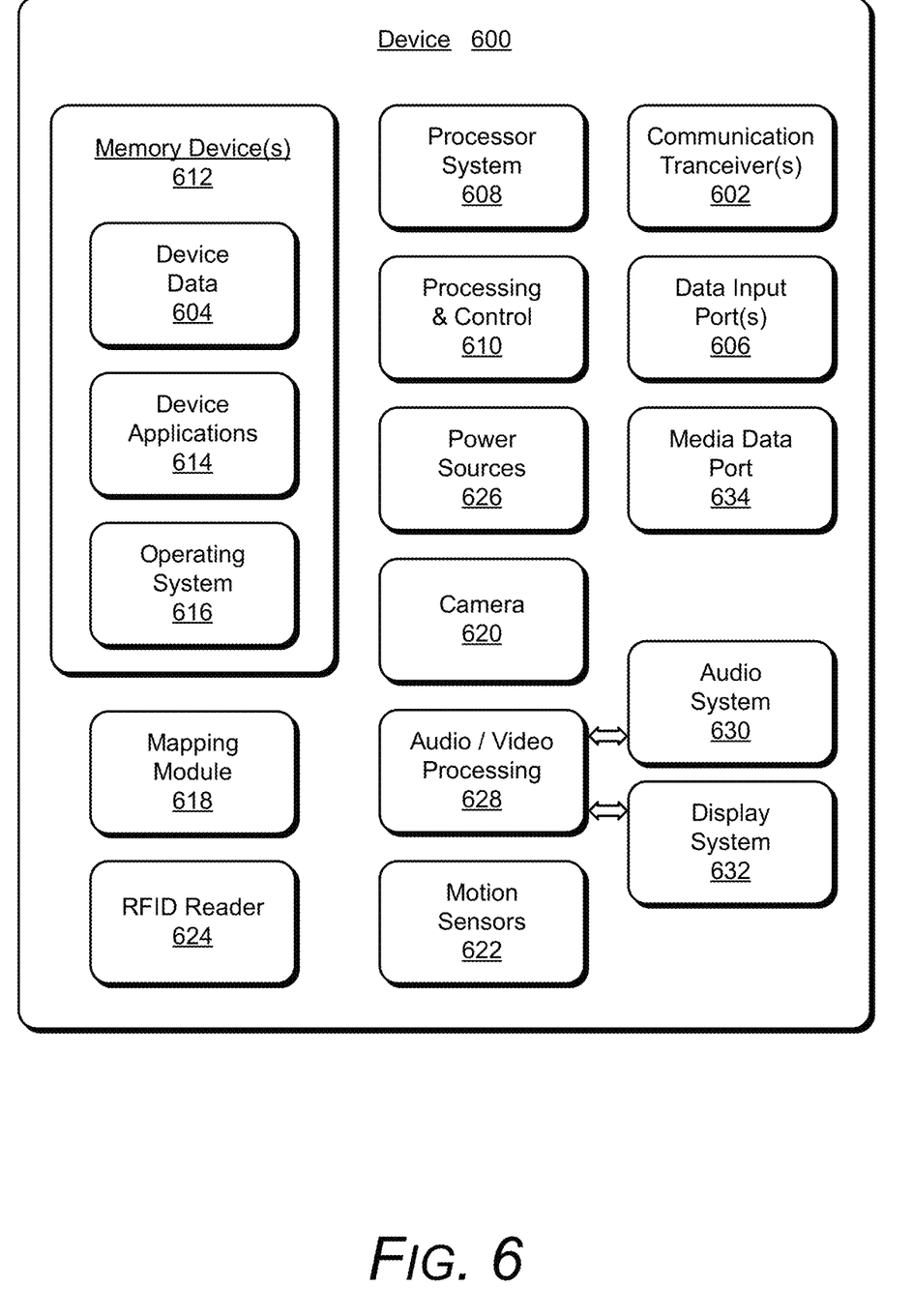
FIG. 6 illustrates various components of an example device that can implement aspects of visual mapping of geo-located tagged objects.

FIG. 6 illustrates various components of an example device 600 in which aspects of visual mapping of geo-located tagged objects can be implemented. The example device 600 can be implemented as any of the devices described with reference to the previous FIGS. 1-5, such as any type of mobile device, mobile phone, client device, tablet, computing, communication, entertainment, gaming, media playback, and/or other type of electronic device. For example, the mobile device 202 shown and described with reference to FIGS. 1-5 may be implemented as the example device 600.

The device 600 includes communication transceivers 602 that enable wired and/or wireless communication of device data 604 with other devices. The device data 604 can include any of the map data, the object location mapping and correlation to particular wireless tags, the RFID tag identifying data, the object metadata, the 3D object model data, and any of the visual mapping data. Additionally, the device data 604 can include any type of audio, video, and/or image data. Example communication transceivers 602 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on.

In this example, the device 600 includes a mapping module 618 that implements aspects of visual mapping of geo-located tagged objects, and may be implemented with hardware components and/or in software as one of the device applications 614, such as when the device 600 is implemented as the mobile device 202 described with reference to FIGS. 1-5. An example of the mapping module 618 is the mapping module 228 that is implemented as a software application and/or as hardware components in the mobile device 202. In implementations, the mapping module 618 may include independent processing, memory, and logic components as a computing and/or electronic device integrated with the device 600.

In this example, the example device 600 also includes a camera 620 and motion sensors 622, such as may be implemented in an inertial measurement unit (IMU). The motion sensors 622 can be implemented with various sensors, such as a gyroscope, an accelerometer, and/or other types of motion sensors to sense motion of the device. The various motion sensors 622 may also be implemented as components of an inertial measurement unit in the device.

The device 600 also includes a radio-frequency identification (RFID) reader 624 that is implemented to interrogate RFID tags for identifying data and receive identification responses from the RFID tags. An example of the RFID reader 624 is the RFID reader 204 that is implemented as an integrated component of the mobile device 202 or as an attachment that operates with the mobile device. The device 600 can also include one or more power sources 626, such as when the device is implemented as a mobile device. In implementations, an RFID reader as an attachment to the device 600 has an external power source. The power sources may include a charging and/or power system, and can be implemented as a flexible strip battery, a rechargeable battery, a charged super-capacitor, and/or any other type of active or passive power source.

The device 600 also includes an audio and/or video processing system 628 that generates audio data for an audio system 630 and/or generates display data for a display system 632. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 634. In implementations, the audio system and/or the display system are integrated components of the example device. Alternatively, the audio system and/or the display system are external, peripheral components to the example device.

Although implementations of visual mapping of geo-located tagged objects have been described in language specific to features and/or methods, the subject of the appended claims is not necessarily limited to the specific features or methods described. Rather, the features and methods are disclosed as example implementations of visual mapping of geo-located tagged objects, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: scanning from a mobile device for wireless-enabled devices within a geo-fenced area; receiving a designation input of a tagged object that corresponds to one of the wireless-enabled devices; generating a visual mapping that displays a route from the mobile device to the tagged object; receiving object metadata about the tagged object as the mobile device approaches the tagged object along the route of the visual mapping, the object metadata including location data of the tagged object; and displaying a three-dimensional (3D) visual representation of the tagged object based on a received 3D object model of the tagged object.

Alternatively or in addition to the above described method, any one or combination of: receiving map data of the geo-fenced area from a controller device of the geo-fenced area; determining the route from the mobile device to the tagged object based on the map data of the geo-fenced area; and said generating the visual mapping based on the map data and said determining the route. The method further comprising: detecting entry into the geo-fenced area by the mobile device; and initiating the scanning for the wireless-enabled devices responsive to the detected entry into the geo-fenced area. The method further comprising: receiving by the mobile device a notice communication from a controller device of the geo-fenced area that detects the mobile device entry into the geo-fenced area; and initiating the scanning for the wireless-enabled devices responsive to the notice communication of detected entry into the geo-fenced area. The method further comprising: receiving the 3D object model of the tagged object from a controller device of the geo-fenced area, the 3D object model stored in a database accessible to the controller device. The wireless-enabled device that corresponds to the tagged object is a RFID tag that identifies the tagged object; and the method further comprising: interrogating the RFID tag by a RFID reader of the mobile device to request the object metadata stored on the RFID tag. The method further comprising: activating a camera of the mobile device to display a region of the geo-fenced area on a display device of the mobile device; displaying the 3D visual representation of the tagged object over the region on the display device; and providing interactive operations on the displayed 3D visual representation of the tagged object. The method further comprising: activating a camera of the mobile device to display a region of the geo-fenced area on a display device of the mobile device; and displaying a location of the tagged object in the region of the geo-fenced area on the display device. The method further comprising: identifying tagged objects, each associated with a respective one of the wireless-enabled devices from the scanning by the mobile device; and displaying the identified tagged objects for user selection on a display device of the mobile device.

A mobile device, comprising: wireless radio systems to scan for wireless-enabled devices within a geo-fenced area; a display device to display a map of the geo-fenced area; a mapping module implemented to: receive a designation input of a tagged object that corresponds to one of the wireless-enabled devices; generate a visual mapping that displays a route from the mobile device to the tagged object; receive object metadata about the tagged object as the mobile device approaches the tagged object along the route of the visual mapping; and initiate to display a three-dimensional (3D) visual representation of the tagged object based on a received 3D object model of the tagged object.

Alternatively or in addition to the above described mobile device, any one or combination of: the map data of the geo-fenced area is received from a controller device of the geo-fenced area; the mapping module is implemented to: determine the route from the mobile device to the tagged object based on the map data of the geo-fenced area; and generate the visual mapping based on the map data and the determined route. The mapping module is implemented to: detect entry into the geo-fenced area; and initiate the wireless radio systems to scan for the wireless-enabled devices responsive to the detected entry into the geo-fenced area. The mapping module is implemented to: receive a notice communication from a controller device of the geo-fenced area that detects the mobile device entry into the geo-fenced area; and initiate the wireless radio systems to scan for the wireless-enabled devices responsive to the notice communication of detected entry into the geo-fenced area. The 3D object model of the tagged object is received from a controller device of the geo-fenced area, the 3D object model stored in a database accessible to the controller device. The wireless-enabled device that corresponds to the tagged object is a RFID tag that identifies the tagged object; and the mobile device further comprising a RFID reader to interrogate the RFID tag to request the object metadata stored on the RFID tag. The mobile device further comprising: a camera activated by the mapping module in a region of the geo-fenced area; wherein: the region of the geo-fenced area is displayed on the display device; and the 3D visual representation of the tagged object is displayed over the region on the display device. The mobile device further comprising: a camera activated by the mapping module in a region of the geo-fenced area; and wherein a location of the tagged object in the region of the geo-fenced area is displayed on the display device. The mapping module is implemented to: identify tagged objects, each associated with a respective one of the wireless-enabled devices from the scan by the wireless radio systems; and the identified tagged objects are displayed on the display device for user selection.

A method comprising: detecting entry into a geo-fenced area by a mobile device; receiving map data of the geo-fenced area from a controller device of the geo-fenced area; receiving location data of a tagged object that corresponds to the mobile device and is located within the geo-fenced area; generating a visual mapping that displays a route from the mobile device to the tagged object in the geo-fenced area; receiving object metadata about the tagged object as the mobile device approaches the tagged object along the route of the visual mapping; activating a camera of the mobile device to display a region of the geo-fenced area on a display device of the mobile device; and displaying a three dimensional (3D) visual representation of the tagged object over the region on the display device based on a received 3D object model of the tagged object.

Alternatively or in addition to the above described method, any one or combination of: interrogating a RFID tag of the tagged object by a RFID reader of the mobile device to request the object metadata stored on the RFID tag; requesting the 3D object model of the tagged object from a controller device of the geo-fenced area; and receiving the 3D object model of the tagged object from the controller device, the 3D object model stored in a database accessible to the controller device.

The invention claimed is:

1. A method, comprising:
   scanning from a mobile device for one or more tagged objects within a geo-fenced area that are each tagged with respective wireless-enabled devices;
   receiving a designation input from a user of the mobile device to select one of the tagged objects that corresponds to one of the wireless-enabled devices;
   generating a visual mapping that displays a route from the mobile device to the tagged object that is selected with the designation input;
   receiving object metadata about the tagged object as the mobile device approaches the tagged object along the route of the visual mapping, the object metadata including location data of the tagged object; and
   displaying a three-dimensional (3D) visual representation of the tagged object based on a received 3D object model of the tagged object, the display of the 3D visual representation of the tagged object replacing the display of the visual mapping of the route to the tagged object.

2. The method as recited in claim 1, further comprising:
   receiving map data of the geo-fenced area from a controller device of the geo-fenced area;
   determining the route from the mobile device to the tagged object based on the map data of the geo-fenced area; and
   wherein generating the visual mapping is based on the map data and determining the route.

3. The method as recited in claim 1, further comprising:
   detecting entry into the geo-fenced area by the mobile device; and
   initiating the scanning for the one or more tagged objects that are each tagged with the respective wireless-enabled devices responsive to the detected entry into the geo-fenced area.

4. The method as recited in claim 1, further comprising:
   receiving by the mobile device a notice communication from a controller device of the geo-fenced area that detects the mobile device entry into the geo-fenced area; and
   initiating the scanning for the one or more tagged objects that are each tagged with the respective wireless-enabled devices responsive to the notice communication of detected entry into the geo-fenced area.

5. The method as recited in claim 1, further comprising:
   receiving the 3D object model of the tagged object from a controller device of the geo-fenced area, the 3D object model stored in a database accessible to the controller device.

6. The method as recited in claim 1, wherein the wireless-enabled device that corresponds to the tagged object is a RFID tag that identifies the tagged object; and the method further comprising:
   interrogating the RFID tag by a RFID reader of the mobile device to request the object metadata stored on the RFID tag.

7. The method as recited in claim 1, further comprising:
   activating a camera of the mobile device to display a region of the geo-fenced area on a display device of the mobile device;
   displaying the 3D visual representation of the tagged object over the region on the display device; and
   providing interactive operations on the displayed 3D visual representation of the tagged object.

8. The method as recited in claim 1, further comprising:
   activating a camera of the mobile device to display a region of the geo-fenced area on a display device of the mobile device; and
   displaying a location of the tagged object in the region of the geo-fenced area on the display device.

9. The method as recited in claim 1, further comprising:
   identifying the one or more tagged objects, each associated with a respective one of the wireless-enabled devices from the scanning by the mobile device; and
   displaying the identified one or more tagged objects for user selection on a display device of the mobile device.

10. A mobile device, comprising:
    wireless radio systems to scan for one or more tagged objects within a geo-fenced area that are each tagged with respective wireless-enabled devices;
    a display device to display a map of the geo-fenced area;
    a mapping module implemented to:
      receive a designation input from a user of the mobile device to select one of the tagged objects that corresponds to one of the wireless-enabled devices;
      generate a visual mapping that displays a route from the mobile device to the tagged object that is selected with the designation input;
      receive object metadata about the tagged object as the mobile device approaches the tagged object along the route of the visual mapping; and
      initiate to display a three-dimensional (3D) visual representation of the tagged object based on a received 3D object model of the tagged object, the display of the 3D visual representation of the tagged object replacing the display of the visual mapping of the route to the tagged object.

11. The mobile device as recited in claim 10, wherein the mapping module is implemented to:
    receive map data of the geo-fenced area from a controller device of the geo-fenced area;
    determine the route from the mobile device to the tagged object based on the map data of the geo-fenced area; and
    generate the visual mapping based on the map data and the determined route.

12. The mobile device as recited in claim 10, wherein the mapping module is implemented to:
    detect entry into the geo-fenced area; and
    initiate the wireless radio systems to scan for the one or more tagged objects that are each tagged with the respective wireless-enabled devices responsive to the detected entry into the geo-fenced area.

13. The mobile device as recited in claim 10, wherein the mapping module is implemented to:
    receive a notice communication from a controller device of the geo-fenced area that detects the mobile device entry into the geo-fenced area; and
    initiate the wireless radio systems to scan for the one or more tagged objects that are each tagged with the respective wireless-enabled devices responsive to the notice communication of detected entry into the geo-fenced area.

14. The mobile device as recited in claim 10, wherein the mapping module is implemented to receive the 3D object model of the tagged object from a controller device of the geo-fenced area, the 3D object model stored in a database accessible to the controller device.

15. The mobile device as recited in claim 10, wherein:
the wireless-enabled device that corresponds to the tagged object is a RFID tag that identifies the tagged object; and
the mobile device further comprising a RFID reader to interrogate the RFID tag to request the object metadata stored on the RFID tag.

16. The mobile device as recited in claim 10, further comprising:
a camera activated by the mapping module in a region of the geo-fenced area; wherein:
the region of the geo-fenced area is displayed on the display device; and
the 3D visual representation of the tagged object is displayed over the region on the display device.

17. The mobile device as recited in claim 10, further comprising:
a camera activated by the mapping module in a region of the geo-fenced area; and
wherein a location of the tagged object in the region of the geo-fenced area is displayed on the display device.

18. The mobile device as recited in claim 10, wherein the mapping module is implemented to:
identify the one or more tagged objects, each associated with a respective one of the wireless-enabled devices from the scan by the wireless radio systems; and
the identified one or more tagged objects are displayed on the display device for user selection.

19. A method, comprising:
detecting entry into a geo-fenced area by a mobile device;
receiving map data of the geo-fenced area from a controller device of the geo-fenced area;
receiving a designation input from a user of the mobile device to select a tagged object;
receiving location data of the tagged object that is located within the geo-fenced area;
generating a visual mapping that displays a route from the mobile device to the tagged object in the geo-fenced area;
receiving a 3D object model of the tagged object and object metadata about the tagged object as the mobile device approaches the tagged object along the route of the visual mapping;
activating a camera of the mobile device to capture images of a region of the geo-fenced area; and
displaying the 3D object model of the tagged object over the images of the region on a display device of the mobile device, the display of the 3D object model of the tagged object replacing the display of the visual mapping of the route to the tagged object.

20. The method as recited in claim 19, further comprising:
interrogating a RFID tag of the tagged object by a RFID reader of the mobile device to request the object metadata stored on the RFID tag;
requesting the 3D object model of the tagged object from a controller device of the geo-fenced area; and
receiving the 3D object model of the tagged object from the controller device, the 3D object model stored in a database accessible to the controller device.

* * * * *